March 28, 1944. H. J. DE N. McCOLLUM ET AL 2,345,140
AIRCRAFT HEATING APPARATUS
Filed Sept. 3, 1942
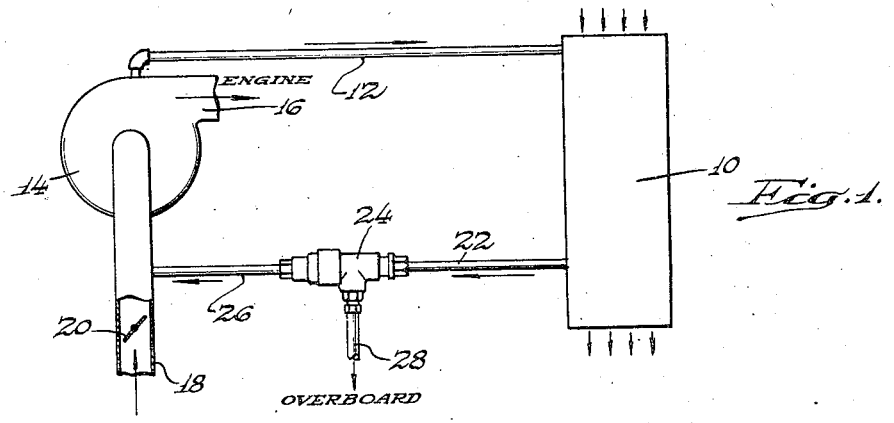
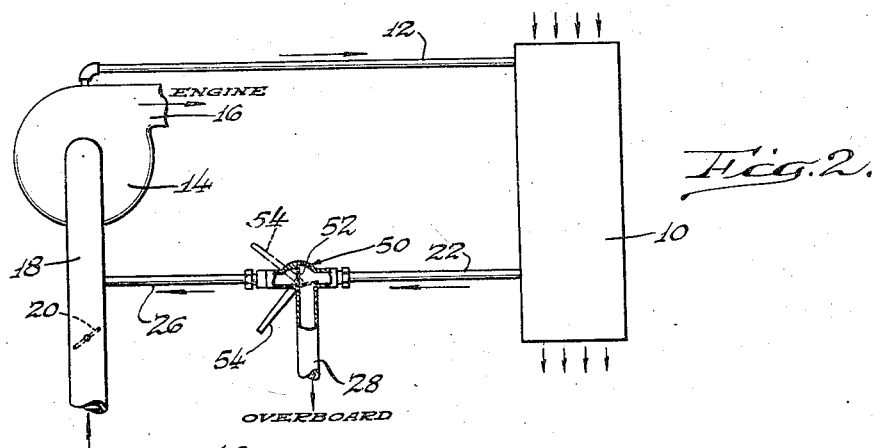
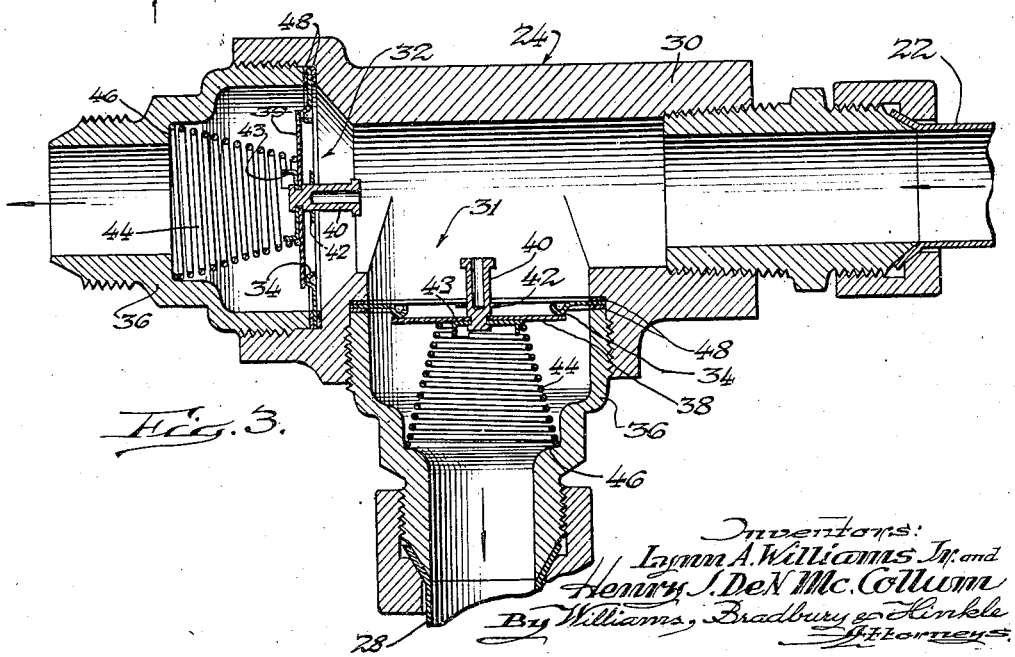

Patented Mar. 28, 1944

2,345,140

UNITED STATES PATENT OFFICE 2,345,140

AIRCRAFT HEATING APPARATUS

Henry J. DeN. McCollum and Lynn A. Williams, Jr., Chicago, Ill.; said Williams assignor to Stewart-Warner Corporation, Chicago, Ill., a corporation of Virginia Application September 3, 1942, Serial No. 457,152

3 Claims. (Cl. 237—12.3)

Our invention relates generally to aircraft heating apparatus and more particularly to means for controlling the operation of such apparatus.

It has become common practice to utilize a portion of the fuel and air mixture supplied to the aircraft engine by its supercharger as a source of combustible mixture for the operation of one or more internal combustion type heaters for heating the cabin and other parts of the aircraft. The products of combustion from the heater have ordinarily been discharged overboard, but in some instances have been returned to the inlet of the supercharger. Under some conditions of operation of the airplane it is desirable to utilize the differential pressure between the inlet and the outlet of the supercharger to cause flow of the combustible mixture to the heater and to cause the discharge of the products of combustion therefrom, while under other conditions of operation the pressure differential between the pressure side of the supercharger and the atmosphere is sufficient for satisfactory operation of the heater.

Although under substantially all conditions of airplane operation, the heater will operate satisfactorily when it is connected between the outlet and the inlet of the engine supercharger, there is a slight disadvantage in permanently connecting the heater in this manner. Even though the products of combustion entering the inlet of the supercharger form but a small percentage of the flow through the supercharger, and the dilution of the mixture supplied to the engines therefore does not noticeably affect engine operation, such dilution must have some effect, and it is therefore advisable to avoid such admixture of the products of combustion from the heater with the charge flowing to the engine whenever possible.

It is therefore an object of our invention to provide an improved means whereby the products of combustion of an internal combustion type heater may alternatively be discharged to the atmosphere or to the inlet of the engine supercharger.

A further object is to provide an improved means for automatically diverting the products of combustion from an internal combustion heater to cause these products to flow to the inlet of the engine supercharger whenever the pressure differential between the outlet of the supercharger and the atmosphere is insufficient to assure satisfactory operation of the heater.

Other objects will appear from the following description, reference being had to the accompanying drawing, in which:

Fig. 1 is a diagrammatic view of a system for operating a heater of the internal combustion type;

Fig. 2 is a diagrammatic view of a modified form of such system;

Fig. 3 is a central longitudinal sectional view of the valve used in the system of Fig. 1.

As shown diagrammatically in Fig. 1, a heater 10 of the internal combustion type is supplied with a combustible mixture through a conduit 12 from the high pressure side of a supercharger 14. The supercharger 14 is the regular airplane supercharger used to supply the explosive mixture to the engine of the airplane through its discharge conduit 16. The mixture for the supercharger 14 is supplied thereto from a carbureting means through a conduit 18, the flow through which is controlled by a throttle valve 20. The products of combustion from the heater flow therefrom through a discharge conduit 22, through a three-way diverter connection 24. The connection 24 is adapted to conduct the flow from the conduit 22 either through a conduit 26 leading into the conduit 18 or through a pipe 28 which leads overboard of the airplane, preferably at a point where the pressure is subatmospheric when the airplane is in flight.

The heater 10 is of the internal combustion type, and may be of any suitable construction in which the burning gases and the products of combustion are hermetically sealed from the ventilating air, such, for example, as shown in the copending application of H. J. DeN. McCollum, Serial No. 447,345, filed June 17, 1942.

The three-way connection 24, as shown in Fig. 3, comprises a body 30 forming a T to one opening of which the conduit 22 is connected by suitable fittings. The other two openings in the body 30 are adapted to be closed by check valves 31 and 32, each comprising a seat 34, which may be in the form of a stamping held in place by a coupling fitting 36. A disc-shaped valve 38 is guided for engagement with the seat 34 by a centering pin 40, which projects through an aperture in a cross piece 42, which may be formed integrally with the valve seat 34. The pin 40 also serves to hold a spring-centering spider 43 to the rear face of the valve, this spider serving to hold in place one end of a conical compression spring 44, the other end of which is seated against a shoulder 46 formed in the coupling fitting 36. The valve seat stamping 34 is clamped between a pair of annular gaskets 48, upon screwing the coupling fitting 36 in place.

The valves 31 and 32 may be constructed identically, except that the spring 44 of the valve 32 is preferably stronger than the spring 44 of the valve 31. For example, the spring for the valve 31 may be just strong enough to bias its valve disc 38 to closed position (when not subjected to pressure), irrespective of the position in which the valve 24 may be mounted in the airplane, while the spring for the valve 32 may be compressed sufficiently so that this valve will open only when it is subjected to a predetermined differential pressure, in the order of 2" to 5" Hg., depending upon the characteristics of the engine and of the airplane with which it is used.

In the operation of the system of Figs. 1 and 3, the valve 31 will open to discharge the products of combustion from the heater overboard whenever the pressure within the valve 24 is slightly above atmospheric pressure, for example, an inch or two of water above atmospheric pressure. Thus, whenever the supercharger 14 is supplying the mixture to the heater at a sufficiently high pressure to maintain the pressure within the body of valve 24 slightly above atmospheric pressure, the products of combustion will be discharged past the valve 31 to the atmosphere.

There are many occasions when the absolute pressure at the inlet to the supercharger is below atmospheric pressure by an inch or two of mercury, while the pressure at the outlet of the supercharger is sufficiently above atmospheric pressure for satisfactory operation of the heater. Under these circumstances, it is desirable to continue to discharge the products of combustion past the valve 31 to the atmosphere, and it is for this reason that the spring of the valve 32 is made sufficiently strong to prevent opening of the valve when these relative pressure conditions prevail. However, when the pressure at the outlet of the supercharger decreases to a value such that the pressure in the body of the valve 24 is no longer slightly above atmospheric pressure, the valve 32 will open and the products of combustion from the heater thus discharged into the induction pipe 18 of the supercharger 14.

It will thus be seen that the products of combustion from the heater will be discharged to the atmosphere whenever this manner of discharge will result in satisfactory operation of the heater, but that when the absolute pressure at the outlet of the supercharger drops to such a low value that discharge to the atmosphere is no longer possible, the products of combustion will flow past the valve 32 into the inlet of the supercharger. It is not essential that there be this difference in the differential pressures at which the valves 31, 32, operate, since, even if the springs 44 are of equal strength, the products of combustion from the heater will be discharged to the atmosphere throughout a large proportion of the time that the system is in operation. However, with the springs 44 of different strength, as described above, the products of combustion will be discharged to the atmosphere a greater proportion of the time than would be the case if the springs 44 were of equal strength.

It will be noted that when either the valve 31 or the valve 32 is open, the area of its valve disc 38 which is exposed to the pressure of the products of combustion in the valve body is increased, so that after one of the valves has been opened, it will tend to be held in open position by the products of combustion flowing against and past it until the pressure differential upon its opposite sides becomes slightly less than that required to open the valve initially.

From the foregoing, it will appear that irrespective of the operating conditions of the airplane and its engine, the heater will be maintained in operation, since the products of combustion will be withdrawn either through the conduit 28 or the conduit 26, depending upon the relationship between atmospheric pressure and the pressures at the inlet and outlet of the supercharger.

It is not essential that the valve which diverts the products of combustion be automatically operable, since in some installations such diversion is required but infrequently. Under some operating conditions, and in some installations of the heating system, the pilot will prefer to continue to have the products of combustion discharged overboard rather than diverting them to the inlet of the supercharger. For such installations, the system of Fig. 2 may be employed. In this figure, parts similar to those previously described with reference to Figs. 1 and 2 bear similar reference characters. In this system, the automatic diverter connection 24 is replaced by a manually operable three-way valve 50, which may be of any suitable construction, but for simplicity is illustrated as having a hinged vane 52 operated by a handle 54. When in the position in which the vane 52 and handle 54 are shown in full lines in Fig. 2, the products of combustion will be discharged overboard through the conduit 28, whereas, when the vane 52 and handle 54 are moved to their dotted line positions, the products of combustion will be discharged through the conduit 28 into the induction conduit 18 of the supercharger 14. Depending upon the location of the valve 50, it may be operated through a suitable Bowden wire or by electromagnetic control means instead of by the handle 54 shown in Fig. 2.

In using the system of Fig. 2, the valve will normally be in its full-line position so that the products of combustion are discharged overboard, but under such conditions where high output of heat from the heater is essential, and such high output is not obtainable due to the low difference in pressure between the pressure side of the supercharger 14 and the atmosphere, the pilot may shift the valve 52 to its dotted-line position, thus utilizing the full differential pressure across the supercharger 14 to assure an adequate supply of combustible mixture to the heater.

While we have shown and described a particular embodiment of our invention, it will be apparent to those skilled in the art that the essential features thereof may be embodied in varied and modified forms. We therefore desire to include within the scope of the following claims, all such modifications and variations of the invention whereby substantially the results of the invention may be obtained through the use of substantially the same or equivalent means.

We claim:

1. In an airplane having a supercharger for supplying a mixture of fuel and air to the engine, the combination of a heater of the internal combustion type, means for conducting a fuel and air mixture from the pressure side of said supercharger to said heater for combustion therein, a conduit for conveying products of combustion from said heater, a three-way connection having one port receiving products of combustion from said last named conduit, a conduit connecting the inlet of said supercharger to a second port of said three-way connection, a conduit connecting the third port of said three-way connection to the atmosphere, valve means controlling flow from the three-way connection to the supercharger inlet conduit responsive to the differential of pressures therebetween, and separate valve means controlling flow from the three-way connection to the atmosphere conduit responsive to the differentials in pressure therebetween.

2. In an airplane having a supercharger for supplying a mixture of fuel and air to the engine, the combination of a heater of the internal combustion type, means for conducting a fuel and air mixture from the pressure side of said supercharger to said heater for combustion therein, a first conduit for conveying products of combustion from said heater, a valve body having three ports, one port receiving products of combustion from said first conduit, a second conduit connecting the inlet of said supercharger to a second port of said valve body, a third conduit connecting the third port of said valve body to the atmosphere, and loaded check valves in said second and in said third conduits, said check valves being arranged to open to pass the products of combustion to whichever of said second and third conduits is at the lower pressure.

3. In an airplane having a supercharger for supplying a mixture of fuel and air to the engine, the combination of a heater of the internal combustion type, means for conducting a fuel and air mixture from the pressure side of said supercharger to said heater for combustion therein, an exhaust conduit for conveying products of combustion from said heater, valve means connected to receive products of combustion from said exhaust conduit, a suction conduit connected to the inlet of said supercharger, a discharge conduit connected to the atmosphere, and means responsive to the relative pressures in said suction and discharge conduits to control the operation of said valve means and cause the products of combustion to flow through said suction conduit or through said discharge conduit, whichever is at the lower pressure.

HENRY J. DeN. McCOLLUM.
LYNN A. WILLIAMS, Jr.